Figure 1:
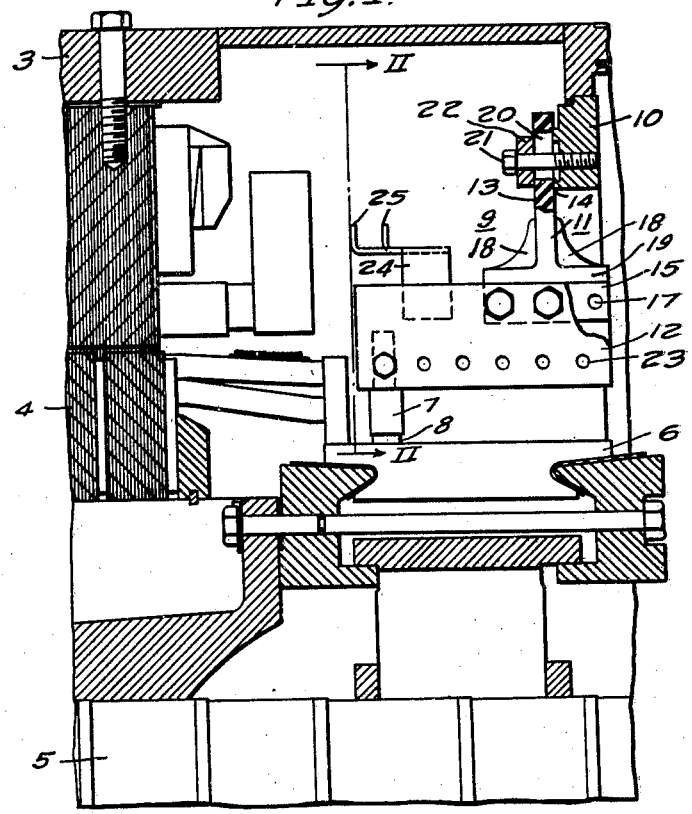

Jan. 25, 1944.  R. N. CAMBRIDGE  2,340,039
BRUSHHOLDER BRACKET
Filed July 29, 1942

WITNESSES:

INVENTOR
Robert N. Cambridge.
BY
ATTORNEY

Patented Jan. 25, 1944

2,340,039

UNITED STATES PATENT OFFICE 2,340,039

BRUSH-HOLDER BRACKET

Robert N. Cambridge, Forest Hills, Pa., assignor to Westinghouse Electric & Manufacturing Company, East Pittsburgh, Pa., a corporation of Pennsylvania Application July 29, 1942, Serial No. 452,711

6 Claims. (Cl. 171—324)

My invention relates primarily to brushholder brackets such as are used on fabricated, heavy-duty, direct-current motors and generators, and it is an improvement on a type of construction, which has been standard for many years, in which the brushholders were supported on brackets of fabricated steel construction, which were, in turn, insulatedly supported from a steel rocker-ring through insulating spacing-plates and insulating tubes or bushings surrounding the bolts which were used to clamp the brackets to the rocker-ring. This previously standard steel bracket consisted of a radially extending plate, welded, in right-angular edgewise relation, to an axially extending plate, with an inclined brace also welded between the two, so as to hold them rigidly in place. The flat surfaces of the two plates had to be accurately machined, so that said surfaces would be perfectly smooth, and at right angles to each other, as nearly so as could be made within the limits of the machining operations and the warping due to welding, the radially extending plate or flange being insulatedly clamped to the rocker-ring, and the axially extending plate or flange being utilized to support an axially extending row of brushholders, carrying brushes bearing on the face of the commutator. The insulation depended upon the creepage-distances which were provided by extending the insulating spacing-plates beyond the steel parts of the brushholder-bracket and the rocker-ring, the practically available creepage-distances being only slightly more than necessary, with only a moderate factor of safety.

In earlier days, various attempts had been made to utilize insulating supporting-blocks, insulating rocker-rings, two-part metal brackets having one part insulatedly and non-adjustably secured to the rocker-ring and the other part adjustably connected to the first part, and various other expedients, but for many years these had all been abandoned, in this type of brushholder-support, in favor of the fabricated steel brushholder-brackets previously mentioned, with the necessary adjustment secured by radially elongated bolt-holes in the radially extending plate or flange which was insulatedly and adjustably secured to the rocker-ring.

In my present invention, I avoid the expenses of machining and welding, I avoid the inevitable inaccuracies resulting from the limitations of the machining operations and the warping due to welding, and I avoid the limitations of barely adequate creepage-distances, by making the right-angled brushholder-supporting bracket of an insulating material which can be molded to accurate, uniform, dimensions, with smooth surfaces accurately positioned at right angles to each other, and with creepage-distances which are so much in excess of the previously used, barely adequate distances that they are substantially infinite in so far as any measurable leakage-current is concerned. Since my new molded bracket may be made in a very accurate mold, its flat surfaces are very much flatter and smoother than fabricated steel surfaces, my new bracket can be readily shaped to provide strengthening and rigidifying ribs, and to produce a very pleasing appearance; and if necessary, a reinforcing metal plate may be imbedded in the molded insulating material. Preferably, the axially extending flange of my insulating bracket carries a metal plate which supports a row of brushholders extending across the face of the commutator, and affording a common terminal-connection means for the entire row of brushes. I thus provide a brushholder-bracket saving ⅓ of the cost of the previously standard bracket, with the several sets of brushholders accurately held, parallel to themselves, with an additional mechanical strength giving, if desired, a greater factor of safety, with very many times the insulation-strength and creepage-distance to ground, and moreover with a better appearance.

Figure 2:
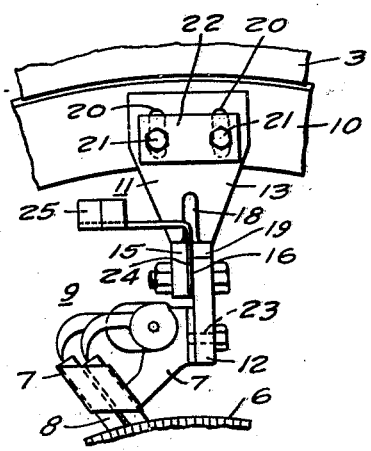

In the accompanying drawing, I have shown a preferred form of construction illustrating my invention, wherein Fig. 1 is a fragmentary longitudinal sectional view through a large direct-current dynamo-electric machine embodying my new brushholder-bracket, and Fig. 2 is a transverse sectional view on the plane indicated by the line II—II in Fig. 1.

In the drawing, I have illustrated my invention on a direct-current dynamo-electric machine having a field-frame 3, and a rotatable armature 4 mounted on a shaft 5 which supports a cylindrical-surfaced commutator 6 or other rotatable current-collecting device. At various points around the commutator 6, I provide axially alined rows of brushholders 7, each carrying a brush 8 bearing on the commutator 6. Each row of brushholders 7 is carried by its own brushholder-bracket assembly 9, which is supported from a steel rocker-ring 10 which is common to all of the brushholders of the machine.

According to my invention, each brushholder-bracket assembly 9 comprises an insulating right-angled bracket 11, which is preferably made of a moldable insulating-material such as "Moldarta," which can be accurately molded, in a press, under a heavy hydraulic pressure of 1000 pounds per square inch, and which is capable of being given accurate, uniform dimensions, with smooth surfaces, and which may, or may not, be reinforced. Preferably, also, I utilize a metal plate 12, which is carried by the insulating bracket 11, and which, in turn, supports the brushholders 7.

The insulating bracket 11 is a flanged member having an integral, insulating, radially extending flange-portion 13 having a flat side-surface 14 adapted to be clamped against a side-surface of the rocker-ring 10. The bracket 11 also has an integral, insulating, axially extending flange-portion 15 having a flat side-surface 16 perforated with three bolt-holes 17 for the attachment of the brushholder-supporting plate 12. The bracket 11 is also preferably provided with various strengthening-ribs, such as the gussets 18 and the L-shaped flange 19 on the axially extending flange-portion 15, all molded integrally with the bracket. The radially extending flange 13 of the bracket is provided with two radially elongated bolt-holes 20 for adjustably receiving the bolts 21 which clamp the bracket 11 to the rocker-ring 10, a steel backing-plate 22 being provided, for the bolt-heads.

The brushholder-supporting plate 12 is provided with a row of holes 23, preferably one per brushholder, for receiving clamping-bolts for rigidly and non-adjustably supporting the axially alined row of brushholders 7. This plate 12 also provides a terminal-connection means 24 for the electric terminal-leads 25 common to the entire row of brushholder supported by said plate.

In my construction, brush-spacing and adjustment of the brackets for commutator-wear is provided by means of the slotted holes 20 molded in the flat radial flange 13 of each bracket. All other connections are preferably held non-adjustable, so that the initial molding of the brackets, and the single radial adjustment of the bracket-mounting on the rocker-ring 10, will insure, at all times an accurate mounting and alinement of the brushes.

I claim as my invention:

1. The combination: with an electric machine having a rotatable cylindrical-surfaced current-collecting member, brush-means bearing thereon, and a metallic rocker-ring; of brushholder mounting-means comprising a plurality of right-angled brackets of insulating material, each having an integral, insulating, radially extending flange-portion having a flat side-surface adapted to be clamped against a side-surface of the rocker-ring, each bracket also having an integral, insulating, axially extending flange-portion having a flat side-surface at right-angles to the flat side-surface of the radially extending flange-portion, and metallic brush-supporting means secured to the flat side-surface of the axially extending flange-portion of each bracket for supporting a portion of the brush-means which bears on said rotatable current-collecting member.

2. The invention as defined in claim 1, characterized by each metallic brush-supporting means comprising a metal plate secured to the flat side-surface of the axially extending flange-portion, and a plurality of axially alined brushholders secured to each metal plate.

3. The invention as defined in claim 1, characterized by each metallic brush-supporting means comprising a metal plate non-adjustably secured to the flat side-surface of the axially extending flange-portion, a plurality of axially alined brushholders non-adjustably secured to each metal plate, and radially adjustable means for securing the radially extending flange-portion of each insulating bracket to the rocker-ring.

4. The invention as defined in claim 1, characterized by each insulating bracket comprising a moldable material capable of being molded to accurate, uniform, dimensions, with smooth surfaces accurately directed at right angles to each other.

5. Brushholder-mounting means comprising a right-angled bracket of insulating material, having an integral, insulating, radially extending flange-portion having a flat side-surface adapted to be clamped against a support, said bracket also having an integral, insulating, axially extending flange-portion having a flat side-surface at right-angles to the flat side-surface of the radially extending flange-portion, and characterized by having a metal plate secured to the flat side-surface of the axially extending flange-portion, said plate having means for securing an electrical terminal-connection and for securing a plurality of brushholders thereto.

6. Brushholder-mounting means comprising a right-angled bracket of insulating material, having an integral, insulating, radially extending flange-portion having a flat side-surface adapted to be clamped against a support, said bracket also having an integral, insulating, axially extending flange-portion having a flat side-surface at right-angles to the flat side-surface of the radially extending flange-portion, and characterized by having a metal plate non-adjustably secured to the flat side-surface of the axially extending flange-portion, said plate having means for securing an electrical terminal-connection thereto, and means for non-adjustably securing a plurality of brushholders thereto, and said insulating bracket having one or more radially elongated bolt-receiving openings in its radially extending flange-portion.

ROBERT N. CAMBRIDGE.